US008483472B2

(12) United States Patent
Manabe

(10) Patent No.: US 8,483,472 B2
(45) **Date of Patent: *Jul. 9, 2013**

(54) PAPER SHEET IDENTIFYING DEVICE AND PAPER SHEET IDENTIFYING METHOD

(75) Inventor: Kunihiro Manabe, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 292 days.

This patent is subject to a terminal disclaimer.

(21) Appl. No.: 12/865,794

(22) PCT Filed: Jan. 30, 2009

(86) PCT No.: PCT/JP2009/051641

§ 371 (c)(1), (2), (4) Date: Aug. 2, 2010

(87) PCT Pub. No.: WO2009/096553

PCT Pub. Date: Aug. 6, 2009

(65) Prior Publication Data

US 2010/0329507 A1 Dec. 30, 2010

(30) Foreign Application Priority Data

Jan. 31, 2008 (JP) ................................ 2008-020515

(51) Int. Cl.
*G06K 9/00* (2006.01)
*G06K 9/62* (2006.01)

(52) U.S. Cl.
USPC ........... 382/135; 382/209; 382/215; 382/218; 382/225; 382/278; 340/5.86; 356/71; 356/73; 708/813

(58) Field of Classification Search
None
See application file for complete search history.

(56) References Cited

U.S. PATENT DOCUMENTS 7,089,420 B1 * 8/2006 Durst et al. .................. 713/176

(Continued)

FOREIGN PATENT DOCUMENTS

| | | |
|---|---|---|
| CN | 1774730 | 5/2006 |
| CN | 101057263 | 10/2007 |
| GB | 2438494 A * | 11/2007 |

(Continued)

OTHER PUBLICATIONS

Office Action, CN, Feb. 22, 2012, Office Action in corresponding Chinese application.

*Primary Examiner* — Stephen R Koziol
*Assistant Examiner* — Timothy Choi
(74) *Attorney, Agent, or Firm* — KMF Patent Services, PLLC; Kenneth M. Fagin, Esq.

(57) ABSTRACT

A paper sheet identification apparatus capable of identifying an authenticity of a watermark area formed on a paper sheet is provided without increasing the cost. The paper sheet identification apparatus includes: a light receiving part receiving reflected light from a watermarked image formed on a paper sheet to be conveyed, a converter converting the reflected light from the watermarked image received by the light receiving part for each pixel as a unit of a predetermined size including color information having brightness; and an identification processing part identifying the authenticity of the watermarked image based on a correlation coefficient, which is calculated from a density value for each pixel converted by the converter and a density value for each pixel by the transmitted light from the watermarked image of the bill serving as a reference.

22 Claims, 9 Drawing Sheets

U.S. PATENT DOCUMENTS 8,265,336 B2 * 9/2012 Manabe ........................ 382/100
2006/0251287 A1 11/2006 Tsurumaki et al.
2007/0165286 A1 * 7/2007 Endo et al. .................... 358/474
2007/0182952 A1 * 8/2007 Nishita et al. ............ 356/139.04
2008/0137072 A1 6/2008 Itako et al.
2010/0322503 A1 * 12/2010 Manabe ........................ 382/135

FOREIGN PATENT DOCUMENTS

JP 8 221632 8/1996
JP 2003 288627 10/2003
JP 2005 321880 11/2005
JP 2006 285775 10/2006

* cited by examiner

| i \ j | 1 | 2 | 3 | 4 | 5 | 6 | 7 |
|---|---|---|---|---|---|---|---|
| 1 | 87 | 46 | 215 | 5 | 188 | 132 | 62 |
| 2 | 108 | 50 | 253 | 48 | 106 | 2 | 141 |
| 3 | 103 | 33 | 185 | 17 | 61 | 19 | 206 |
| 4 | 140 | 26 | 25 | 25 | 120 | 28 | 155 |
| 5 | 18 | 7 | 218 | 45 | 122 | 1 | 45 |
| 6 | 203 | 5 | 211 | 28 | 94 | 14 | 143 |
| 7 | 167 | 18 | 140 | 4 | 228 | 17 | 47 |
| 8 | 214 | 18 | 154 | 3 | 50 | 18 | 139 |
| 9 | 215 | 24 | 153 | 4 | 126 | 44 | 88 |
| 10 | 104 | 40 | 78 | 35 | 70 | 25 | 227 |
| 11 | 193 | 25 | 43 | 32 | 202 | 17 | 50 |
| 12 | 173 | 201 | 128 | 45 | 109 | 181 | 151 |

| | | |
|---|---|---|
| Average density value | F | 93 |

| i \ j | 1 | 2 | 3 | 4 | 5 | 6 | 7 |
|---|---|---|---|---|---|---|---|
| 1 | 168 | 209 | 40 | 250 | 67 | 123 | 193 |
| 2 | 147 | 205 | 2 | 207 | 149 | 253 | 114 |
| 3 | 152 | 222 | 70 | 238 | 194 | 236 | 49 |
| 4 | 115 | 229 | 230 | 230 | 135 | 227 | 100 |
| 5 | 237 | 248 | 37 | 210 | 133 | 254 | 210 |
| 6 | 52 | 250 | 44 | 227 | 161 | 241 | 112 |
| 7 | 88 | 237 | 115 | 251 | 27 | 238 | 208 |
| 8 | 41 | 237 | 101 | 230 | 205 | 237 | 116 |
| 9 | 40 | 231 | 102 | 251 | 129 | 211 | 167 |
| 10 | 151 | 215 | 177 | 220 | 185 | 230 | 28 |
| 11 | 62 | 230 | 212 | 223 | 53 | 238 | 205 |
| 12 | 82 | 54 | 127 | 210 | 146 | 74 | 104 |

| | | |
|---|---|---|
| Average density value | S | 162 |

*Fig. 10A*

| i\j | 1 | 2 | 3 | 4 | 5 | 6 | 7 |
|---|---|---|---|---|---|---|---|
| 1 | 87 | 46 | 215 | 5 | 188 | 132 | 62 |
| 2 | 108 | 50 | 253 | 48 | 106 | 2 | 141 |
| 3 | 103 | 33 | 185 | 17 | 61 | 19 | 206 |
| 4 | 140 | 26 | 25 | 25 | 120 | 28 | 155 |
| 5 | 18 | **7** | **218** | **45** | 122 | 1 | 45 |
| 6 | 203 | **5** | **211** | **28** | 94 | 14 | 143 |
| 7 | 167 | **18** | **140** | **4** | 228 | 17 | 47 |
| 8 | 214 | **18** | **154** | **35** | 50 | 18 | 139 |
| 9 | 215 | **24** | **153** | **4** | 126 | 44 | 88 |
| 10 | 104 | 40 | 78 | 35 | 70 | 25 | 227 |
| 11 | 193 | 25 | 43 | 32 | 202 | 17 | 50 |
| 12 | 173 | 201 | 128 | 45 | 109 | 181 | 151 |

*Fig. 10B*

| i\j | 1 | 2 | 3 | 4 | 5 | 6 | 7 |
|---|---|---|---|---|---|---|---|
| 1 | 168 | 209 | 40 | 250 | 67 | 123 | 193 |
| 2 | 147 | 205 | 2 | 207 | 149 | 253 | 114 |
| 3 | 152 | 222 | 70 | 238 | 194 | 236 | 49 |
| 4 | 115 | 229 | 230 | 230 | 135 | 227 | 100 |
| 5 | 237 | **248** | **37** | **210** | 133 | 254 | 210 |
| 6 | 52 | **250** | **44** | **227** | 161 | 241 | 112 |
| 7 | 88 | **237** | **115** | **251** | 27 | 238 | 208 |
| 8 | 41 | **237** | **101** | **230** | 205 | 237 | 116 |
| 9 | 40 | **231** | **102** | **251** | 129 | 211 | 167 |
| 10 | 151 | 215 | 177 | 220 | 185 | 230 | 28 |
| 11 | 62 | 230 | 212 | 223 | 53 | 238 | 205 |
| 12 | 82 | 54 | 127 | 210 | 146 | 74 | 104 |

*Fig. 10C*

| i\j | j-1 | j | j+1 |
|---|---|---|---|
| i-1 | 0.7233 | -0.7356 | 0.6263 |
| i | 0.7786 | -0.9995 | 0.7935 |
| i+1 | 0.8353 | -0.9228 | 0.7149 |

PAPER SHEET IDENTIFYING DEVICE AND PAPER SHEET IDENTIFYING METHOD

FIELD OF THE INVENTION

The present invention relates to a paper sheet identification apparatus (or paper sheet identifying device) and a paper sheet identification method which identify the authenticity of a bill, a gift certificate, a coupon ticket, and so on (hereafter, these are collectively referred to as "a paper sheet") and a paper sheet identification method thereof.

BACKGROUND ART

In general, a bill processing apparatus, which handles a bill as one of the embodiments of the paper sheet, is incorporated into a service device such as a game medium rental machine installed in a game hall, a vending machine or a ticket-vending machine installed in a public space, or the like which identifies the authenticity of the bill inserted from a bill insertion slot by a user and provides various types of products and services in accordance with a value of the bill having been judged as authentic.

Usually, the authenticity of the bill is identified by a bill identification apparatus installed in a bill traveling route continuously extending from a bill insertion slot. The bill moving inside the bill traveling route is irradiated with light, and transmitted light and reflected light therefrom are received by a light receiving sensor, and the received light data is compared with the legitimate data to identify the authenticity of the bill.

Meanwhile, various innovations have been devised for bills in order to prevent counterfeiting thereof. As one of those, a watermark with an uneven portrait is formed by a special technique, or a see-through patterned mark which can be determined as authentic or counterfeit with a tactile sense is formed (hereinafter, watermarks formed on bills or see-through patterning are collectively referred to as "a watermark"). Such a watermark may be utilized as an authenticity identification object area in order to improve the identification accuracy of the authenticity of the bill. In Patent reference 1, for example, a bill discrimination device is disclosed, which discriminates the authenticity of the bill by irradiating infrared light and visible light to a watermark and acquiring transmitted light and reflected light therefrom. [Patent Reference 1] Japanese unexamined patent application publication No. 2006-285775

DISCLOSURE OF THE INVENTION

Problem to be Solved by the Invention

Since the above-mentioned watermark of the bill is formed by the specialized technique such that the bills cannot be counterfeited, it is considered extremely effective in determining the authenticity. Assuming that an attempt is made to counterfeit such a watermark, a light printed image which is similar to the watermarked image is possibly created onto either surface of a paper to be counterfeited.

In this way, with respect to a counterfeit bill on which a watermarked image is formed by performing a light printing onto either surface, in accordance with the technology disclosed in Patent reference 1 described above, a bill is irradiated with light and reflected light therefrom is acquired, thereby enabling the authenticity to be identified with respect to the bill.

A paper sheet identification apparatus and a paper sheet identification method are provided in which the authenticity of a watermark area formed on the paper sheet can be identified for a controlled cost.

Means to Solve the Problem

In the present invention, a paper sheet identification apparatus includes: light receiving means for receiving reflected light from a watermarked image formed on a paper sheet to be conveyed; a converter which converts the reflected light from the watermarked image being received by the light receiving means into data for each pixel of a predetermined size as a unit, which contain color information having brightness; and an identification processing part which calculates a correlation coefficient from a density value for each pixel converted by the converter and a density value for each pixel of transmitted light from the watermarked image of the paper sheet serving as a reference, and identifies the authenticity of the watermarked image based on the correlation coefficient. Further features of the present invention, its nature, and various advantages will be more apparent from the accompanying drawings and the following description of the preferred embodiment.

BRIEF DESCRIPTION OF THE DRAWINGS

FIG. 10A is a diagram illustrating a method of processing a comparison area by utilizing the array data of the pixels shown in FIG. 8A.

FIG. 10B is a diagram illustrating a method of processing a comparison area by utilizing the reference array data of the pixels shown in FIG. 8B.

FIG. 10C is a diagram illustrating a variation of a correlation coefficient when the comparison area of FIG. 10A is shifted up-and-down and left-and-right by one pixel from the array data of FIGS. 8A and 8B.

DESCRIPTION OF NOTATIONS

Figure 1:
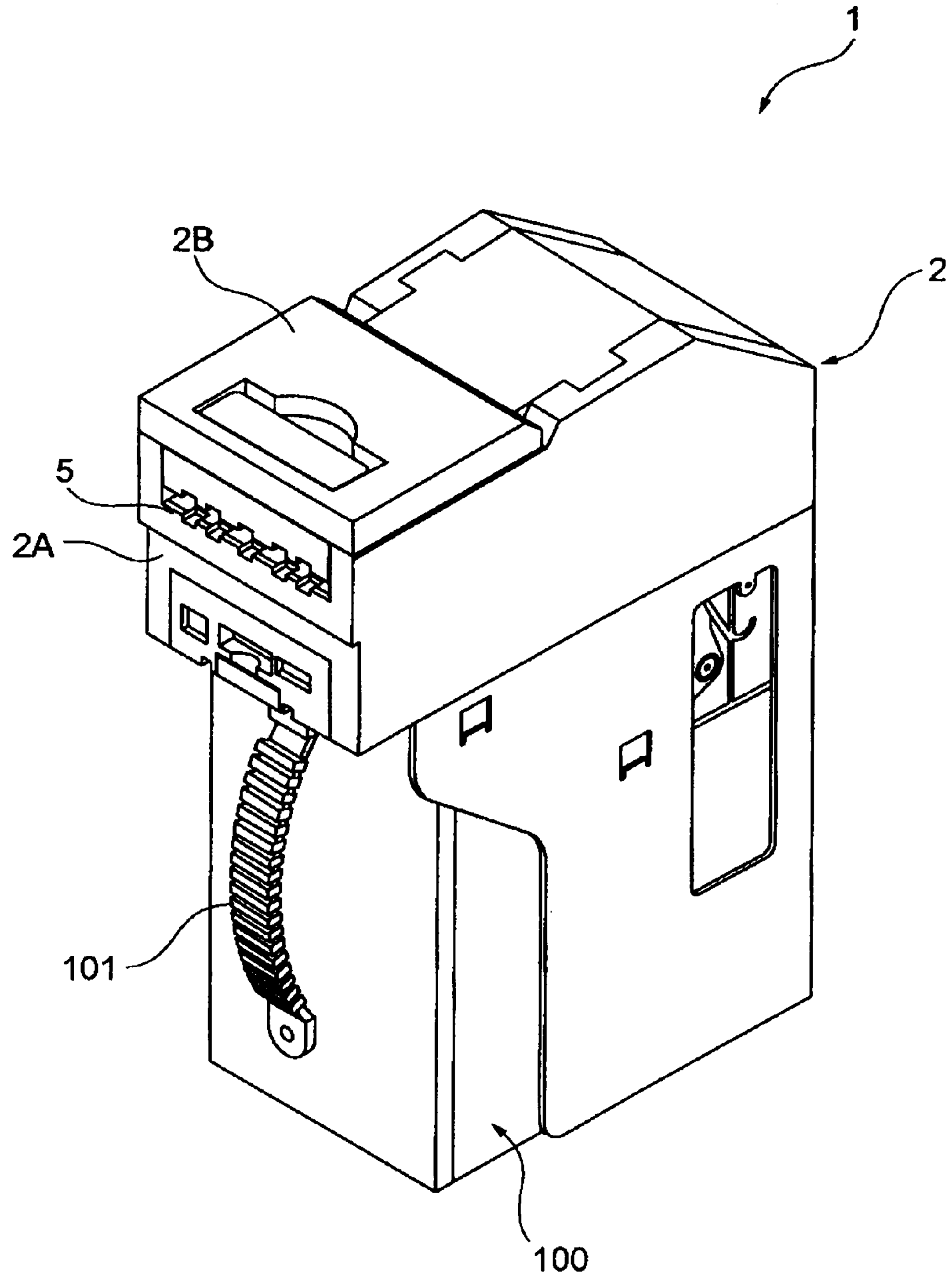
FIG. 1 is a perspective view showing an entire structure to illustrate an example a bill identification apparatus of a paper sheet identification apparatus.

1 bill processing apparatus
2 apparatus main body
3 bill traveling route
5 bill insertion slot
8 bill reading means
10 skew correction mechanism
80 light emitting unit
80*a* first light emitting part
81 light receiving/emitting unit
81*a* light receiving part
81*b* second light emitting part
200 control means

BEST MODE FOR CARRYING OUT THE INVENTION

Hereinafter, an embodiment of the present invention will be described with reference to the drawings.

Figure 2:
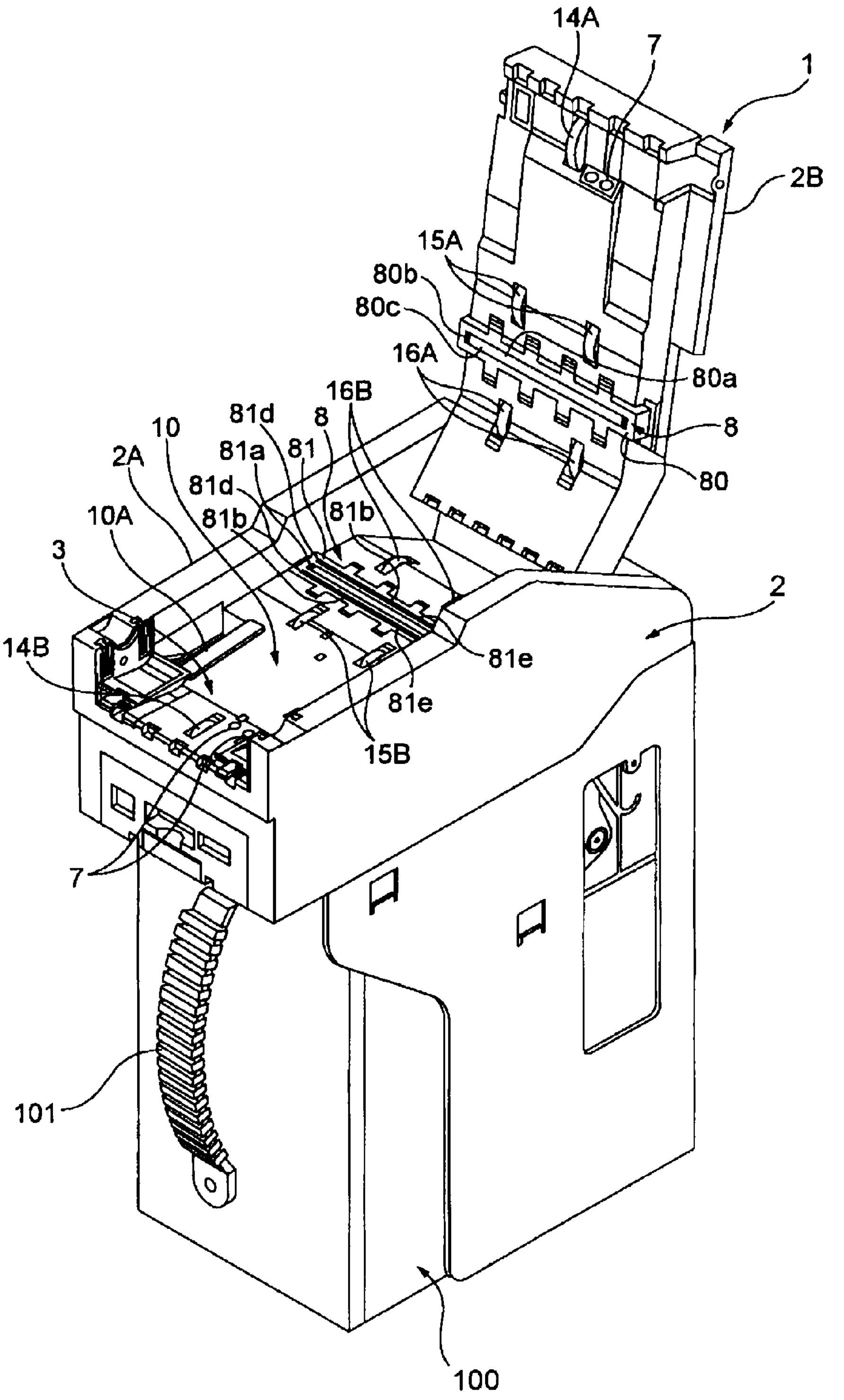
FIG. 2 is a perspective view showing the bill identification apparatus in a state that an open/close member is opened for a main body frame of an apparatus main body.
Figure 3:
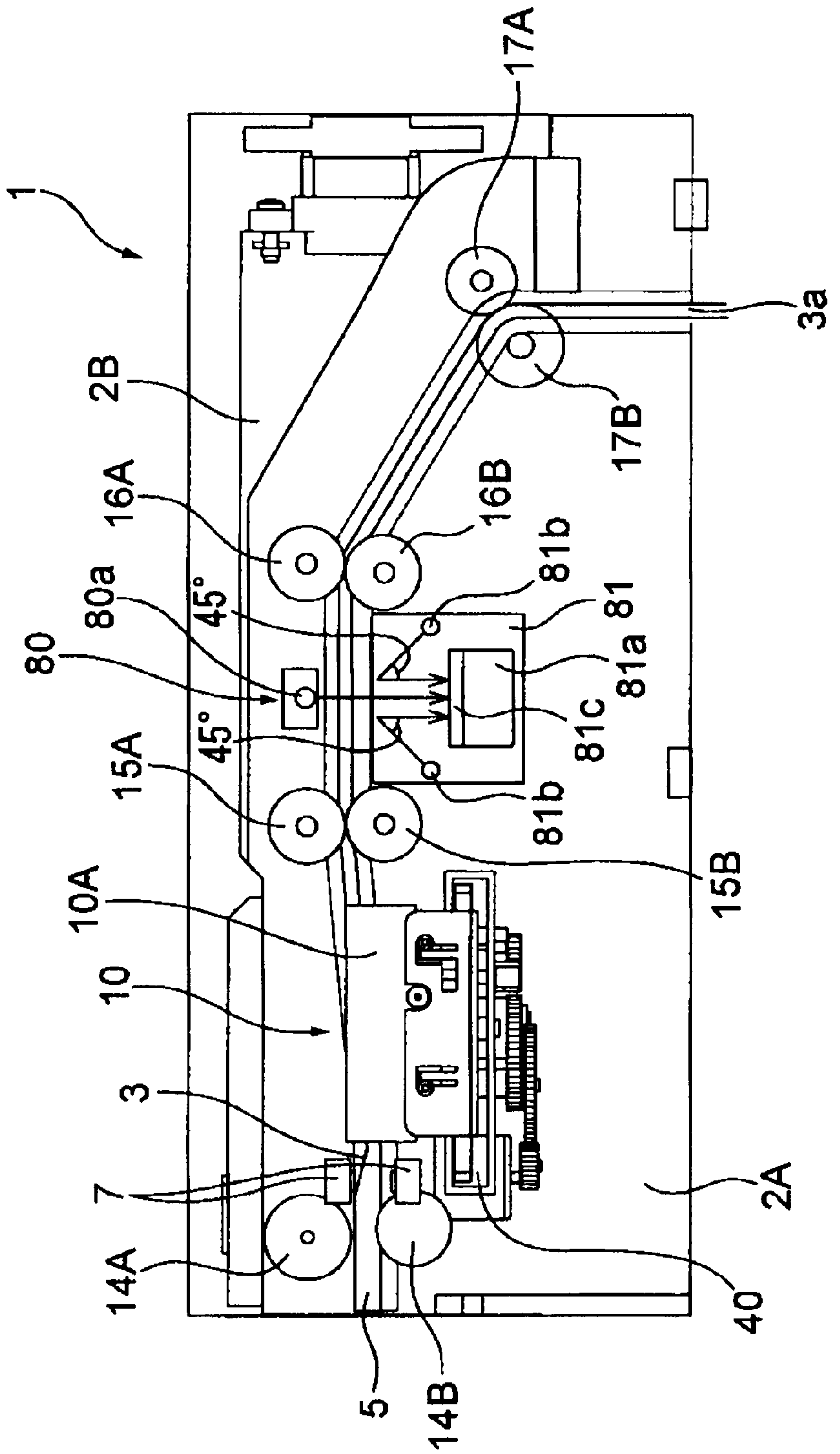
FIG. 3 is a right side view schematically showing a traveling route of a bill to be inserted from an insertion slot.

FIGS. 1 to 3 are diagrams showing an example in which a paper sheet identification apparatus of the present invention is applied to a bill identification apparatus; FIG. 1 is a perspective view showing an entire structure thereof; FIG. 2 is a perspective view showing the state that an open/close member is opened for a main body frame of an apparatus main body; and FIG. 3 is a right side view schematically showing a traveling route of a bill to be inserted from an insertion slot.

A bill identification apparatus 1 of this embodiment is so configured that it can be incorporated into, for example, various types of gaming machines such as a slot machine and the like, and the bill processing apparatus 1 includes an apparatus main body 2 and a housing part (e.g., stacker or cashbox) 100 which is provided to the apparatus main body 2 and is capable of stacking and housing a great number of bills. Here, the housing part 100 may be mountable to and demountable from the apparatus main body 2, and it is possible, for example, to remove from the apparatus main body 2 by pulling a handle 101 provided on the front face thereof in a state that a lock mechanism (not shown) is unlocked.

As shown in FIG. 2, the apparatus main body 2 has a main frame body 2A and an open/close member 2B being configured to be opened and closed for the main body frame 2A by rotating around an axis positioned at one end thereof as a rotating center. Then, as shown in FIG. 3, the frame 2A and the open/close member 2B are configured to form a space (bill traveling route 3) through which a bill is conveyed such that both face each other across the space when the open/close member 2B is closed for the main body frame 2A, and to form a bill insertion slot 5 such that front exposed faces of both are aligned and that the bill traveling route 3 exits at the bill insertion slot 5. In addition, the bill insertion slot 5 is a slit-like opening from which a short side of a bill can be inserted into the inside of the apparatus main body 2.

Also, in the apparatus main body 2, a bill conveyance mechanism that conveys a bill along a bill traveling route 3; an insertion detecting sensor 7 that detects the bill inserted into the bill insertion slot 5; bill reading means 8 that is installed on a downstream side of the insertion detecting sensor 7 and reads out information on the bill in a traveling sate; and a skew correction mechanism 10 that accurately positions and conveys the bill with respect to the bill reading means 8 are provided.

Hereafter, the respective components described above will be described in detail. The bill traveling route 3 extends from the bill insertion slot 5 toward the inside, and comprises a discharge slot 3*a* formed on the downstream side through which a bill is discharged into a bill housing part 100.

The bill conveyance mechanism is a mechanism capable of conveying the bill inserted from the bill insertion slot 5 along the insertion direction, and of conveying back the bill in an insertion state toward the bill insertion slot 5. The bill conveyance mechanism comprises a motor 13 (refer to FIG. 5) serving as a driving source installed in the apparatus main body 2; and conveyor roller pairs (14A and 14B), (15A and 15B), (16A and 16B), and (17A and 17B) which are installed at predetermined intervals along the bill traveling direction in the bill traveling route 3, and are driven to rotate by the motor 13.

The conveyor roller pairs are installed so as to be partially exposed on the bill traveling route 3, and all the pairs are constituted of driving rollers of the conveyor rollers 14B, 15B, 163, and 17B installed on the underside of the bill traveling route 3 driven by the motor 13; and pinch-rollers of the conveyor rollers 14A, 15A, 16A, and 17A installed on the upperside and driven by the these driving rollers. In addition, the conveyor roller pair (14A and 14B) to first nip and hold therebetween the bill inserted from the bill insertion slot 5, and to convey the bill toward the back side, as shown in FIG. 2, is installed in one portion of the center position of the bill traveling route 3, and a couple of the conveyor roller pairs (15A and 15B), (16A and 16B), or (17A and 17B) being disposed in this order on the downstream side thereof are respectively installed in a couple of portions with a predetermined interval in the lateral direction of the bill traveling route 3.

Further, the conveyor roller pair (14A and 14B) disposed in the vicinity of the bill insertion slot 5 is usually in a state that the upper conveyor roller 14A is spaced from the lower conveyor roller 14B, and the upper conveyor roller 14A is driven to move toward the lower conveyor roller 14B to nip and hold the inserted bill therebetween when insertion of the bill is sensed by the insertion detecting sensor 7.

Further, the skew correction mechanism 10 comprises a pair of right and left movable pieces 10A (only one side is shown) such that the pair of right and left movable pieces 10A are moved to get closer with each other by driving a motor 40 for a skew driving mechanism, whereby the skew correction process is performed for the bill.

The insertion detecting sensor 7 is to generate a detection signal when a bill inserted into the bill insertion slot 5 is detected. And when the detection signal is generated, the above-mentioned motor 13 is driven in a normal direction and the bill is conveyed in the insertion direction. The insertion detecting sensor 7 of this embodiment is installed between the pair of conveyor rollers (14A and 14B) and the skew correction mechanism 10 and comprises, for example, an optical sensor such as a regressive reflection type photo sensor. However, the insertion detecting sensor 7 may comprise a mechanical sensor other than the optical sensor.

The bill reading means 8 reads bill information on the bill conveyed in a state that the skew is eliminated by the skew correction mechanism 10, and determines the validity (authenticity). In this embodiment, the bill reading means 8 is configured to comprise a line sensor which irradiates the bill being conveyed from top and bottom sides thereof with light such that transmitted light and reflected light thereof are detected by a light receiving element so as to perform reading.

An authenticity identification process in this embodiment is, in order to make an attempt to improve the identification accuracy, configured such that a printed portion of a bill to be conveyed is irradiated with light, transmitted light and reflected light therefrom are received, to identify whether or not a feature point in the printed portion (an area of the feature point serving as the identification object and a way of extracting the area are arbitrarily determined) is matched to that of the legitimate bill by utilizing the above-mentioned bill reading means 8.

Then, in the present invention, when such an authenticity identification process is executed, a watermarked portion formed on the bill is also designated as an identification object area in an authenticity judgment process, and as will be described later, an authenticity judgment is performed such that the bill information on the watermarked portion read by the bill reading means 8 is converted into a two-dimensional image. That is, since the watermarked portion is a characteristic portion serving as one of the means in order to prevent the bill from being counterfeited, it is possible to further improve the identification accuracy by acquiring a two-dimensional image of such a watermarked area and comparing the two-dimensional image with data on the watermarked portion of the legitimate bill.

Also, since the legitimate bill has some area from which different image data are acquired depending on the wavelengths of the lights (for example, visible light or infrared light) irradiated to the area, in this embodiment, a plurality of light sources, in consideration of this view point, irradiate different lights of different wavelengths (in this embodiment, a red light and an infrared light are irradiated) to the bill and a transmitted light therethrough and a reflected light thereon are detected such that the authenticity identification accuracy may be improved. That is, since the red light and the infrared light have different wavelengths, transmitted-light data and reflected-light data from a plurality of lights of different wavelengths may be utilized for the bill authenticity judgment whereby the judgment may use the nature that the transmittance of the transmitted light transmitted through the specific area and the reflectance of the reflected light reflected on the specific area in the legitimate bill are different from those of the counterfeit bill. Therefore, an attempt is made to further improve the bill authenticity identification accuracy by employing light sources where a plurality of wavelengths are available.

Here, a concrete bill authenticity identification method will not be written in detail since it is possible to acquire various kinds of received-light data (transmitted-light data and reflected-light data) depending on the wavelengths of the irradiated lights to the bill and the irradiated areas of the bill. However, for example, in a watermarked area of the bill, if an image on the area is viewed with lights of different wavelengths, the image appears greatly different depending on the lights. Therefore, it can be considered that the bill to become an identification object is identified as the legitimate bill or the counterfeit bill by setting this portion as the specified area, acquiring transmitted-light data and reflected-light data from the specified area, and comparing such data with legitimate data from the same specified area of the legitimate bill having been stored in advance in storage means (ROM). At this time, provided that specified areas are predetermined according to the kind of the bill, predetermined weighting may be applied to the transmitted-light data and the reflected-light data from this specified area, thereby enabling improvement of the authenticity identification accuracy.

Then, since the above-mentioned bill reading means 8 is, to be described later, configured to perform the lighting control of the light emitting part with a predetermined interval and to comprise the line sensor which detects the transmitted light and the reflected light as the bill passes through, it is possible to acquire the image data based on the plurality of pieces of pixel information in a predetermined size as a unit by the line sensor.

In this case, the image data acquired by the line sensor is converted into data containing color information having brightness for each pixel by a converter which will be described later. In addition, the color information of each pixel having brightness to be converted by the converter corresponds to a contrasting density value, i.e., a density value (luminance value), and a numerical value from 0 to 255 (0: black to 255: white) is allocated to each pixel, for example, as information of one byte according to its density value.

Therefore, in above-mentioned authenticity identification process, not limited to the watermarked portion formed on the bill, but a variety of area of the bill is extracted; the pixel information (density values) contained in the extracted area and the pixel information in the same area of the legitimate bill are used so as to be substituted into an appropriate correlating equation; and then a coefficient of correlation is obtained by carrying out an operation thereof, thereby enabling the authenticity identification judgment by the coefficient. Or, in addition to the above description, analog waveforms, for example, are generated from the transmitted-light data and the reflected-light data, and the respective shapes of those waveforms are compared with each other, thereby enabling the authenticity identification judgment by such comparison.

Here, the configuration of above-mentioned reading means 8 will be described in detail with reference to FIGS. 2 and 3.

The abovementioned bill reading means 8 has a light emitting unit 80 which is installed on the side of the open/close member 2B and provided with a first light emitting part 80*a* capable of irradiating the upper side of the bill to be conveyed with the infrared light and the red light, and a light receiving/emitting unit 81 which is installed on the side of the main body frame 2A.

The light receiving/emitting unit 81 has a light receiving part 81*a* which is provided with a light receiving sensor facing the first light emitting part 80*a* across the bill and second light receiving parts 81*b* which are installed adjacently on the both sides of the light receiving part 81*a* along the bill traveling direction and are capable of irradiating the object with the infrared light and the red light.

The first light emitting part 80*a* disposed to face the light receiving part 81*a* works as a light source for the transmissive light. This first light emitting part 80*a* is, as shown in FIG. 2, comprised of a rectangular bar-like body made of synthetic resin which emits the light guided through a light guiding body 80*c* provided inside from an LED element 80*b* fixed to one end of the bar-like body. The first light emitting part having such a configuration is linearly installed in parallel with the light receiving part 81*a* (light receiving sensor) so as to be capable of entirely and equally irradiating the entire range in the width direction of the traveling route of the bill to be conveyed although the configuration is simple.

The light receiving part 81*a* of the light receiving/emitting unit 81 is formed in a thin-walled plate shape having a band shape extending in a lateral direction of the bill traveling route 3 and having a width to an extent that the sensitivity of the light receiving sensor (not shown) provided in the light receiving part 81*a* is not affected. In addition, the light receiving sensor is configured as a so-called line sensor in which a plurality of CCDs (Charge Coupled Devices) are provided linearly in the center in the thickness direction of the light receiving part 81*a*, and a GRIN lens array 81*c* is disposed linearly above these CCDs so as to collect the transmitted light and the reflected light. Therefore, it is possible to receive the transmitted light or the reflected light of the infrared light or the red light emitted from the first light emitting part 80*a* or the second light emitting parts 81*b* such that the bill serving as the object for authenticity judgment is irradiated with the infrared light or the red light, and generate contrasting density data according to its luminance (pixel data containing information of brightness) as the received-light data and a two-dimensional image on the basis of the contrasting density data.

The second light emitting part 80*b* of the light receiving/emitting unit 81 works as a light source for the reflection light. This second light emitting part 81*b* is, in a similar manner as the first emitting part 80*a*, comprised of a rectangular bar-like body made of synthetic resin which emits the light guided through a light guiding body 81*e* provided inside from an LED element 81*d* fixed to one end of the bar-like body. The second light emitting part 81*b* is also configured to be linearly installed in parallel with the light receiving part 81*a* (line sensor).

The second light emitting parts 81*b* are capable of irradiating the bill with the light at an elevation angle of 45 degrees, for example, and are so installed that the light receiving part 81*a* may receive the reflected light from the bill. In this case, the lights irradiated to the bill by the second light emitting parts 81*b* are to be made incident at 45 degrees onto the light receiving part 81*a*, but the incident angle is not limited to 45 degrees such that the arrangement may be re-arranged as appropriate as long as the lights are irradiated evenly without shading to the surface of the bill. Therefore, the arrangement of the second light emitting parts 81*b* and the light receiving part 81*a* may be appropriately changed in design in accordance with the structure of the bill processing apparatus. Further, the second light emitting parts 81*b* are disposed on the both sides of the light receiving part 81*a* so as to be disposed across it and irradiate the respective lights at respective incident angles of 45 degrees to the bill. This is because, in the case where the surface of the bill has scratches or folded wrinkles, and in the case where the light is irradiated only from one side to an uneven surface generated by these scratches or folded wrinkles, it is unavoidable to make some portions shaded to cause shadow in the uneven surface. Therefore, it is prevented that the shadow is made in the portion of the uneven surface by irradiating the bill with the lights from the both sides, whereby the image data to be acquired can have a higher degree of accuracy than that of the single side irradiation. However, the second light emitting part 81*b* may be installed only on one side to configure the apparatus.

In addition, the configuration, the arrangement, and the like of the light emitting unit 80 and the light receiving/emitting unit 81 as described above are not limited to those described in this embodiment, and may be modified as appropriate.

Figure 4:
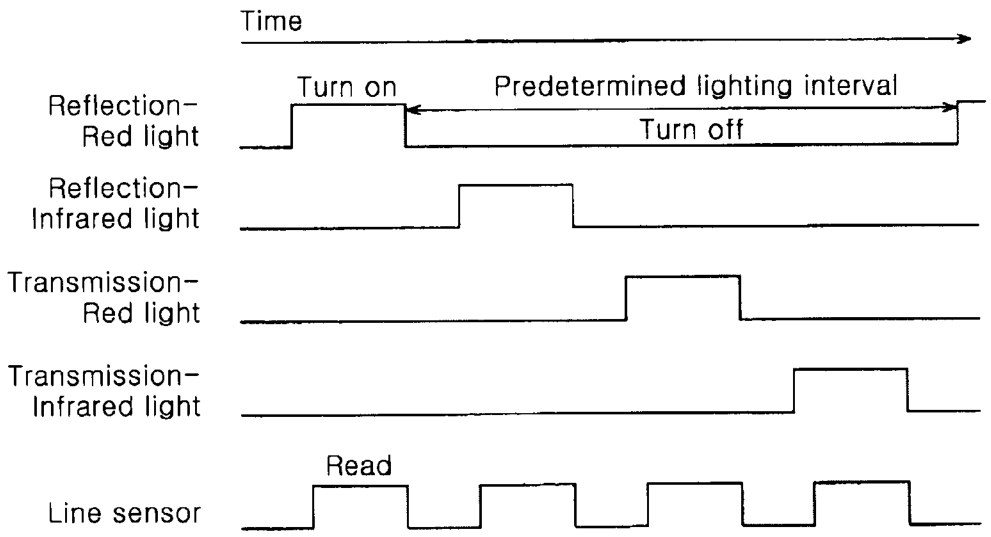
FIG. 4 shows a timing diagram illustrating lighting control of a light emitting part when the bill is read, which indicates the lighting control of the light emitting part in the bill reading means.

Further, in the respective first light emitting part 80*a* and second light emitting part 81*b* in the above-described light emitting unit 80 and the light receiving/emitting unit 81, when the bill is read, as shown in a timing diagram of FIG. 4, an infrared light and a red light are controlled to be turned on and off with predetermined intervals. That is, lighting control is performed such that the four light sources constituted of the transmitting light sources of the red light and the infrared light and the reflecting light sources of the red light and the infrared light in the first light emitting part 80*a* and the second light emitting parts 81*b* repeatedly turn on and off the lights with a constant interval (predetermined lighting interval), and two or more of the light sources do not simultaneously turn on the lights without overlapping the on-phases of the respective light sources in any case. In other words, lighting control is performed such that, while any one light source is turned on, the other three light sources are turned off. Thereby, as described in this embodiment, it is possible even for the one light receiving part 81*a* to detect each light from each light source at a constant interval such that an image constituted of contrasting density data on a printed area of the bill can be read out by a transmitted light and a reflected light of the red light, and a transmitted light and a reflected light of the infrared light, and further it is possible to measure the printing lengths of both surfaces. In this case, it is also possible to improve the resolution by controlling the lighting interval to be shorter.

Then, the bill identified as legitimate by the bill reading means 8, which is configured as described above, is conveyed to the aforementioned bill housing part 100 via a discharge slot 3*a* of the bill traveling route 3 by the bill conveyance mechanism, and the bill is stacked and housed sequentially in the bill housing part. Further, the bill identified as counterfeit is returned toward the bill insertion slot 5 by driving the bill conveyance mechanism to reversely rotate, and the bill is discharged from the bill insertion slot 5.

Next, control means 200 that controls operations of the above-mentioned bill identification apparatus 1 will be described with reference to a block diagram of FIG. 5.

Figure 5:
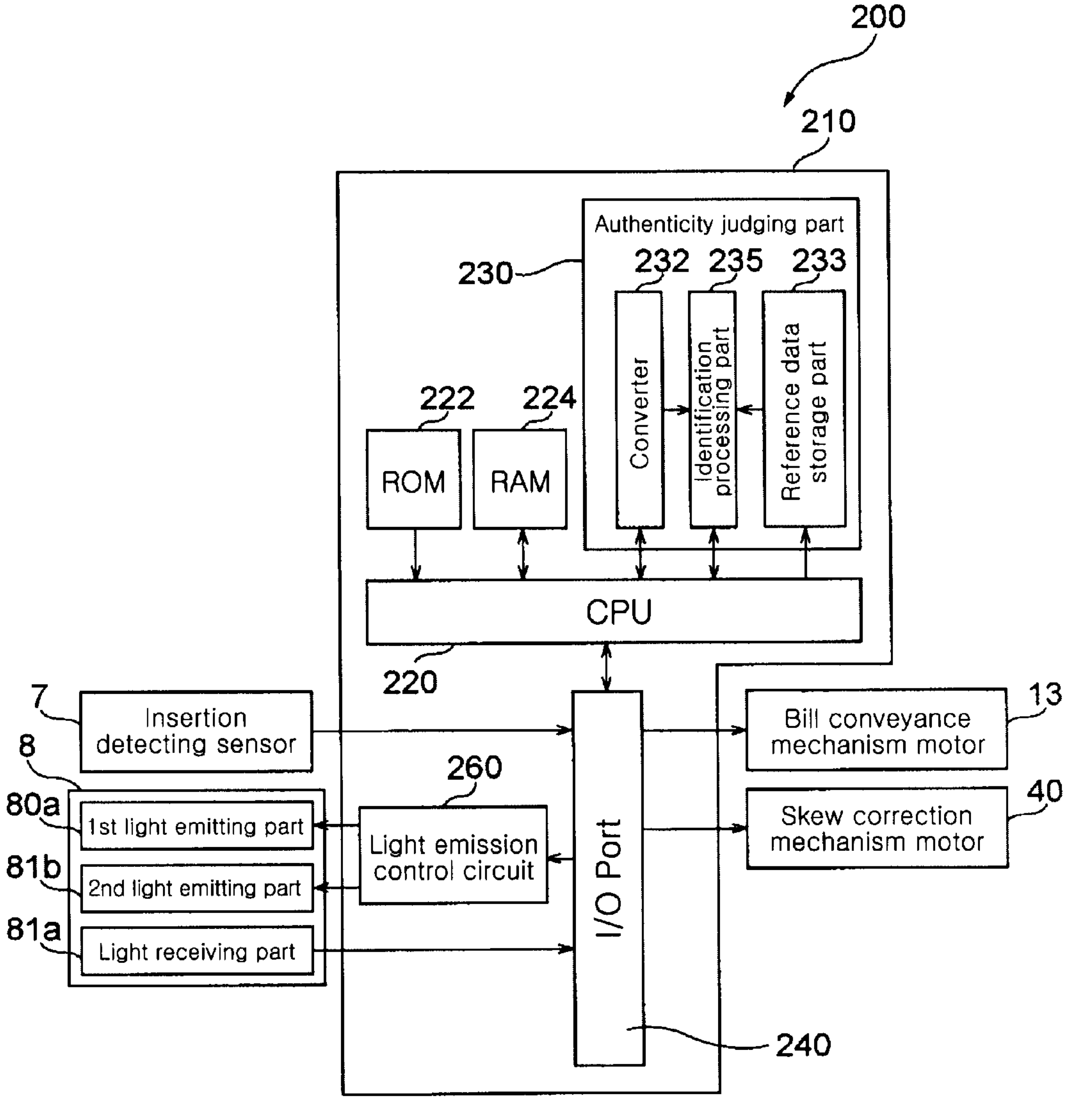
FIG. 5 is a block diagram showing a configuration of control means for controlling an operation of the bill identification apparatus.

The control means 200 as shown in a block diagram of FIG. 5 comprises a control board 210 which controls the operations of the above-described respective drive units, and a CPU (Central Processing Unit) 220 controlling driving of each drive unit and constituting the bill identification means, a ROM (Read Only Memory) 222, a RAM (Random Access Memory) 224, and an authenticity judging part 230 are implemented on the control board 210.

In the ROM 222, permanent data such as various types of programs such as an authenticity judgment program in the authenticity judging part 230, operation programs for the respective drive units such as the motor 13 for the bill conveyance mechanism and the motor 40 for the skew correction mechanism, and the like are stored.

The CPU 220 operates according to the programs stored in the ROM 222, and carries out input and output of the signals with respect to the respective drive units described above via an I/O port 240, so as to perform the entire operational control of the bill identification apparatus. That is, drive units such as the motor 13 for the bill conveyance mechanism, the motor 40 for the skew correction mechanism, and so on are connected to the CPU 220 via the I/O port 240, and the operations of these drive units are controlled by control signals transmitted from the CPU 220 in accordance with the operation programs stored in the ROM 222. Further, the CPU 220 is so configured that detection signals from the insertion detecting sensor 7 and a movable piece passage detecting sensor (not illustrated specifically) are input into the CPU 220 via the I/O port 240, and the driving of the above-mentioned respective drive units is controlled based on these detection signals.

Moreover, the CPU 220 is so configured that a detection signal based on a transmitted light and a reflected light of the light which is irradiated to the bill is input into the CPU 220 via the I/O port 240 from the light receiving part 81*a* in the bill reading means 8 as described above.

The RAM 224 temporarily stores data and programs used for the CPU 220 to operate, and also acquires and temporarily stores the received light data (image data constituted of a plurality of pixels) of the bill.

The authenticity judging part 230 has a function to carry out the authenticity identification process with respect to the bill to be conveyed so as to identify the authenticity of the bill. This authenticity judging part 230 comprises: a converter 232 which converts the received light data of the bill stored in the RAM 224 into pixel information containing color information having brightness (density value) for each pixel; a reference data storage part 233 which stores reference data of the legitimate bill; and an identification processing part 235 which compares the image data (comparison data) converted by the converter 232 with respect to the bill subject to the authenticity judgment object with the reference data stored in the reference data storage part 233 so as to perform the authenticity identification process.

In this case, the above-mentioned reference data storage part stores image data (reference image) of the watermark portion with respect to the legitimate bill being used in conducting actually the authenticity identification process. In particular, this reference image corresponds to an image data constituted of many pixels to be obtained when the transmitted light is received as the watermark image area of the legitimate bill is irradiated with light, and is stored in association with predetermined parameters (xStart, yStart, xsize, ysize).

The reference data (including the reference image) is stored in the dedicated reference data storage part 233. However, the data may be stored in the above-mentioned ROM 222. Further, the reference data (standard data) which is referred to at the time of conducting the authenticity identification process may be stored in advance in the reference data storage part 233. However, the reference data storage part 233 may be so configured, for example, that the received-light data is acquired as a predetermined number of legitimate bills are conveyed by the bill conveyance mechanism, average values are calculated from the thus-obtained data of a great number of legitimate bills, and these average values are stored as the reference data in the reference data storage part 233.

Moreover, the CPU 220 is configured to be connected to the first light emitting part 80*a* and the second light emitting part 81*b* in the aforementioned bill reading means 8 via the I/O port 240. The first light emitting part 80*a* and the second light emitting parts 81*b* are controlled through a light emission control circuit 260 by a control signal from the CPU 220 in accordance with the operation programs stored in the abovementioned ROM 222 such that the lighting interval and the turning-off are controlled.

According to the bill reading means (line sensor) configured as described above, two-dimensional image information can be obtained from a great amount of pixel information. Then, for example, an object area is extracted on the occasion of conducting the authenticity identification on the basis of the brightness information of the respective pixels converted by the above-mentioned converter 232, and thus-extracted image information is compared with the reference data so as to conduct the authenticity identification. In this case, the area serving the authenticity identification object is preferably a portion where it is difficult to make a counterfeit. In the present invention, a two-dimensional image of the area of the watermarked portion of the bill is extracted, and the two-dimensional image is compared with the reference data whereby the authenticity identification process is performed.

Meanwhile, as described above, the contrast inversion of the watermark portion of the bill may occur as a phenomenon when it is viewed by transmitted light and by reflected light. The present invention focuses attention on such a phenomenon, and the authenticity of the watermark portion is to be identified by the light receiving part 81*a* installed on only one side of the bill being conveyed. In addition, since such a phenomenon of contrast inversion can be clearly recognized particularly when a light source to be used emits near-infrared light, in this embodiment, in a process of identifying the authenticity by utilizing the watermark portion, light sources emitting infrared light for transmission and infrared light for reflection are selected and used among a plurality of light sources. That is, it is possible to further improve the identification accuracy of the authenticity thereby.

In detail, a density value for each pixel obtained by the converter 232 with the reflected light from the watermarked image and a density value for each pixel at the same position obtained with transmitted light (this density value is stored as reference data in advance in the reference data storage part 233) have an inverse relationship. Therefore, if a correlation coefficient R is calculated from the both density values for the each pixel, the correlation coefficient shifted on the minus side (negative correlation coefficient) can be obtained within the range of $-1 \leqq R \leqq 1$, to which the correlation coefficient R is confined to. In addition, it is considered that the correlation coefficient could be −1 as an ideal value. However, the correlation coefficient actually becomes a value greater than −1 because of the effect of defacement, wrinkles, misalignment of the watermark of the bill, and so on.

Accordingly, it is possible to derive such a relationship between density values related inversely and obtained by the transmitted light and the reflected light if a threshold value not exceeding predetermined values of both density values is set whereby the authenticity of the watermark formed on the bill can be identified by the light receiving part 81*a* installed only on the one side of the bill to be conveyed.

Figure 6:
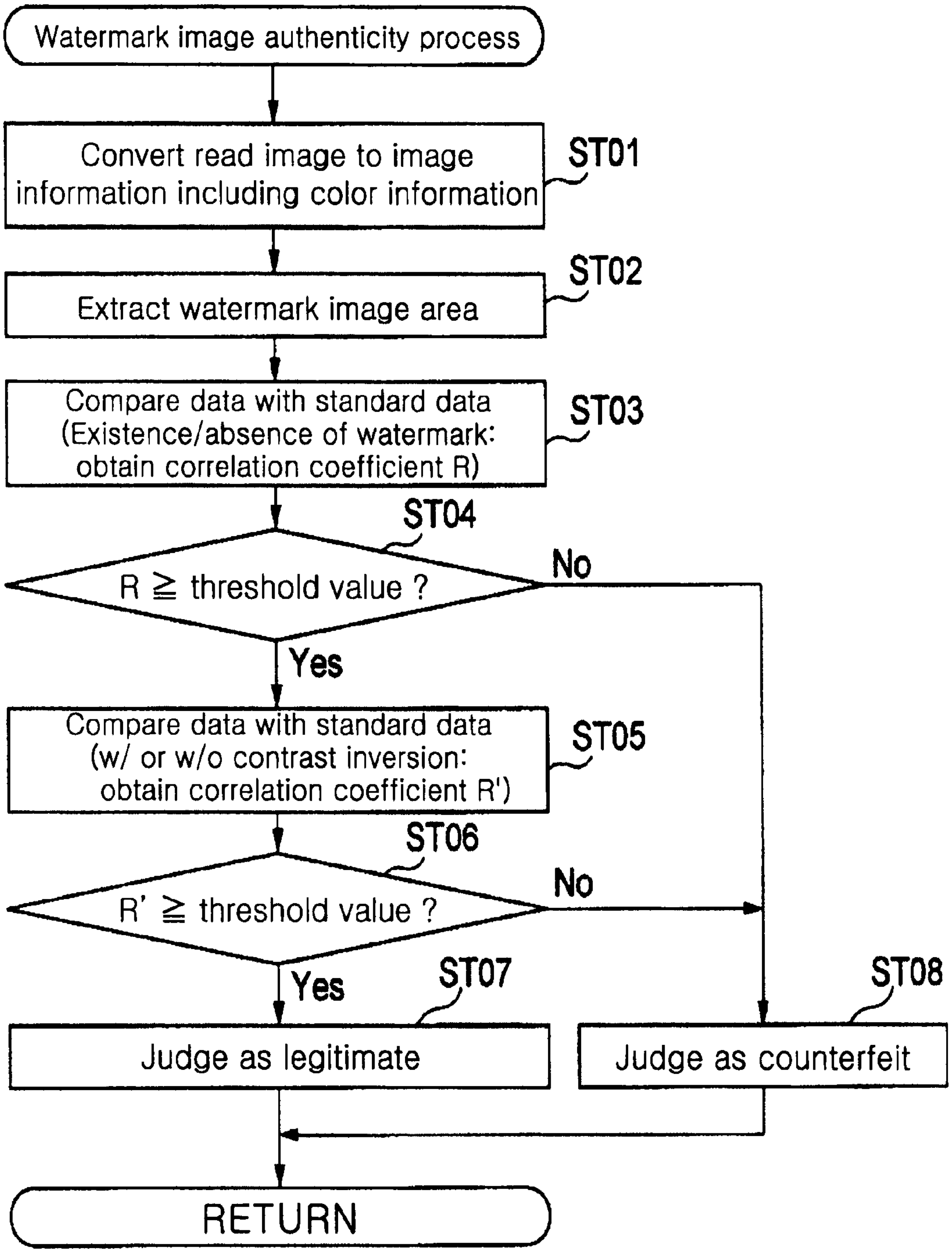
FIG. 6 shows a flowchart illustrating processing operations of an authenticity judgment of the bill.
Figure 7:
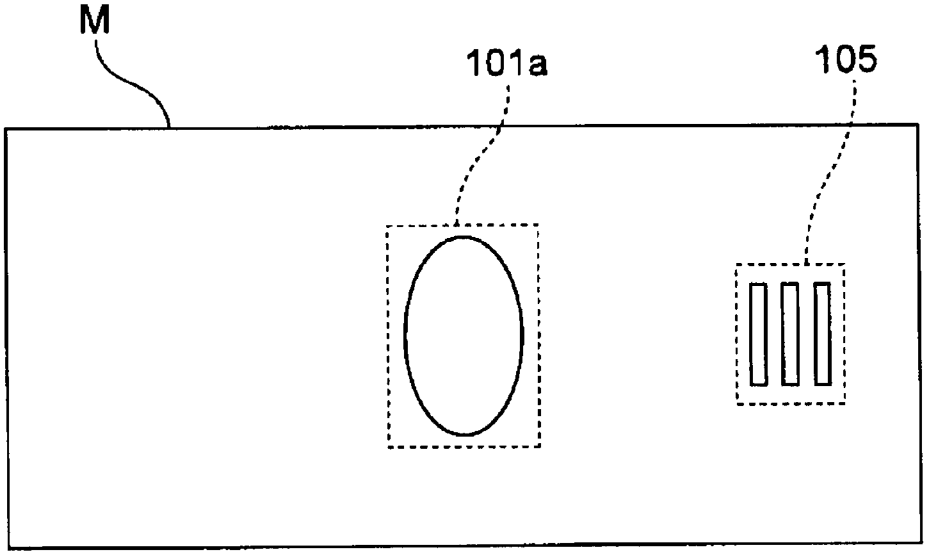
FIG. 7 is a diagram showing a schematic configuration of a reference image data of the bill on which a watermark is formed.

Hereinafter, an example of a technique for an authenticity identification process based on a watermarked image will be described in detail with reference to a flowchart of FIG. 6 and diagrams of FIGS. 7 to 9. In addition, such an authenticity identification process based on the watermarked image is executed as one of the bill authenticity identification processes including some other bill authenticity identification processes to be conducted than this embodiment.

First, the bill reading means 8 performs reading of a bill being conveyed, and a conversion process of the image into pixel information containing color information is performed by the converter 232 (ST01). As described above, the bill reading means 8 irradiates the bill conveyed by the bill conveyance mechanism with light (red light and infrared light) from the first light emitting part 80*a* and the second light emitting parts 81*b*, and receives transmitted light or reflected light therefrom with the light receiving part (line sensor) 81*a*, so as to execute the reading of the bill. It is possible to acquire many pieces of pixel information for a predetermined size of pixel as a unit per each irradiation light while the conveyance processing of the bill is conducted in the reading process, and the image data constituted of many pixels acquired in this way is stored in a RAM 224. And, here, the image data constituted of many pixels being stored is converted into color information having brightness (color information to which a numerical value from 0 to 255 (0: black to 255: white) corresponding to each density value is allocated) for each pixel by the converter 232.

Next, a process of extracting a watermarked image area is conducted from the pixel information being converted in this way (ST02). In this step, since the density value of the pixel information is increased (pixel is whitened) in a stage that the detected area is shifted from the printed area to the watermarked area as the bill is conveyed, for example, it is possible to extract the watermarked image area by setting a threshold value associated with such a change and a position thereof and detecting the position. It is, as a matter of course, possible to extract the watermarked image area by various methods on the basis of the acquired image information or the converted image information. Further, as irradiating light used for extracting the watermarked image, any one of red light and infrared light of transmitted light, and red light and infrared light of reflected light (or a combination thereof) among a plurality of light sources may be used.

Next, in the identification processing part 235, the standard data (the standard data about the watermarked image) stored in advance in the reference data storage part 233 is extracted by use of the above-mentioned parameters, and a comparison process between the standard data and the image data converted from the reflected light by the converter 232 is performed (ST03). In this case, the standard data to be extracted is, for example, as shown in FIG. 7, a two-dimensional image of a watermark area 101*a* or a see-through mark forming area 105 by use of the above-mentioned parameters if a standard image of the bill M is stored in the reference data storage part 233.

The above-mentioned comparison process in ST03 (referred to as "a first comparison process") is a process for judging the presence or absence of the watermark, in which the authenticity of the bill being conveyed is to be identified by deriving the correlation coefficient R given by the following formula 1 such that the image information of the watermark area by the transmitted light from the bill being conveyed and the image information of the standard image of the watermark area by the transmitted light are utilized.

$$R = \frac{\sum_i \sum_j (f[i, j] - F)(s[i, j] - S)}{\sqrt{\sum_i \sum_j (f[i, j] - F)^2} \sqrt{\sum_i \sum_j (s[i, j] - S)^2}} \quad \text{[Formula 1]}$$

In the above-mentioned formula 1, [i, j] corresponds to the coordinate of the area on which the watermark of the bill is formed, and a density value of a two-dimensional image of the data acquired from the bill serving as an identification object of the bill coordinate [i, j] is set to f [i, j], a density value of the standard data is set to s [i, j], an average density of the acquired data is set to F, and an average density value of the standard data is set to S.

The correlation coefficient R derived by the above-mentioned formula 1 is, as known to the public, a value from −1 to +1, and if the R value is closer to +1 (correlation coefficient is higher), it is considered that the degree of similarity is higher. In this case, if the watermark is not formed on the bill being conveyed, the correlation between the both images does not exist (the correlation coefficient approaches to zero (0)). Therefore, a predetermined threshold value is set with respect to the correlation coefficient to be derived, and then it is judged as the counterfeit bill that does not have the watermark formed if the correlation value is actually lower than the predetermined threshold value (ST04; No, ST08).

On the other hand, if the correlation coefficient R is equal to or greater than the threshold value (ST04; Yes), subsequently the second comparison process is preformed (ST05). The comparison process is a processing to identify the authenticity by utilizing the relationship since the contrasts of the image data obtained by the transmitted light and by the reflected light (image data by a reflection light source that emits infrared light is employed among the light sources because the phenomenon is prominently observed with near infrared light) are inverted, and the authenticity of the bill being conveyed is identified by deriving the correlation coefficient R' given by the above-mentioned formula 1 utilizing the image information of the watermark area by the reflected light from the bill being conveyed and the image information of the standard image of the watermark area by the transmitted light.

Figure 8A:
FIG. 8A is a diagram illustrating an array of pixels including color information obtained by reflected light from the bill being conveyed.

This authenticity identification process will be described with reference to FIGS. 8A and 8B. FIG. 8A shows image data by the reflected light (reflection data based on near-infrared light) in the see-through mark forming area 105 of the bill being conveyed, which indicates pixel information containing color information converted by the converter 232. In addition, in FIG. 8A, in order to simplify the description, it is assumed that a length of twelve (12) pixels is taken in one direction (vertical direction) and a length of seven (7) pixels is taken in the traveling direction (horizontal direction) such that the see-through mark forming area 105 is extracted. Further, FIG. 8B is the standard data of the see-through mark forming area stored in advance in the reference data storage part 233, and shows image data by the transmitted light in the same position of FIG. 8A.

The image data of the both are in a relationship of contrast inversion as described above. That is, since the density value for each pixel acquired by the reflected light from the watermarked image and the density value for each pixel in the same position acquired by the transmitted light are in an inverse relationship such that the correlation coefficient R' is calculated from the density values for the respective pixels of both images to yield a value shifted on the negative side (negative correlation coefficient) in the range of $-1 \leqq R' \leqq 1$, to which any value of the correlation coefficient R' can be confined.

Figures 8B, 9:
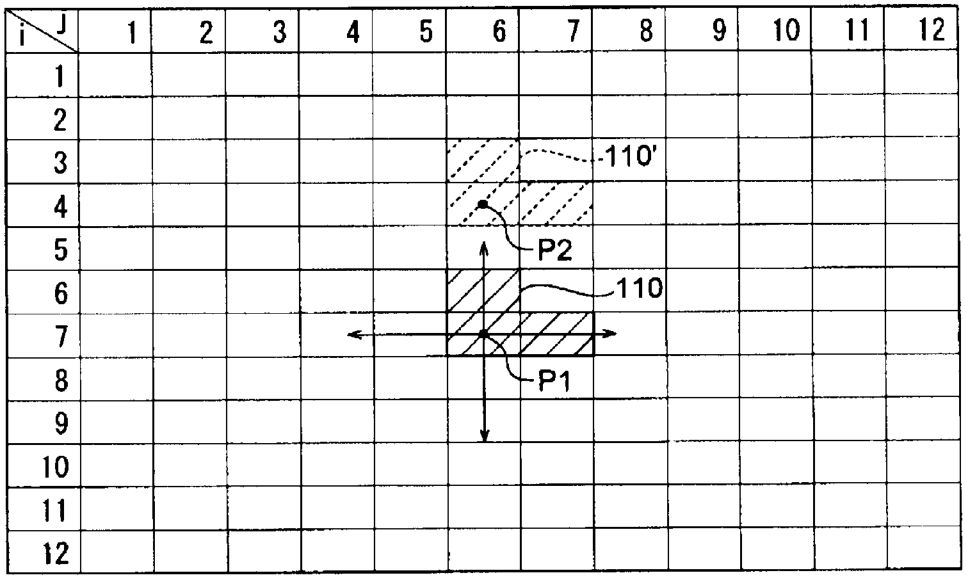
FIG. 8B is a diagram illustrating an array of pixels including color information obtained by transmitted light from the legitimate bill.
FIG. 9 is a diagram illustrating an array of pixels including color information and explaining a general operation of a local search.

In addition, in the relationship between the image data shown in FIGS. 8A and 8B, respectively, every sum of respective density values for each corresponding pixel position is 255 such that the correlation coefficient of −1 is obtained as the ideal value. However, the correlation coefficient actually should be a value greater than −1 because of the effect of defacement, wrinkles, misalignment of the watermark of the bill, and so on. Therefore, if the threshold value is set to −1 (a numerical value close to −1), even the legitimate bill may be eliminated as a counterfeit. So, the threshold value R' is set to a value greater than −1 (which may even be on the plus (+) side), and when the correlation coefficient R' is less than the threshold value, the bill is judged as the legitimate bill (ST06; Yes, ST07), and when the correlation coefficient R' is greater than or equal to the threshold value, the bill is judged as a counterfeit bill (ST06; No, ST08).

As described above, it is possible to derive such a relationship between density values related inversely and obtained by the transmitted light and the reflected light to be irradiated to the bill, whereby the authenticity of the watermark formed on the bill can be identified by the light receiving part 81*a* installed only on the one side of the bill to be conveyed.

In addition, in ST03 and ST05 described above, it is preferable that, in the comparison process by the identification processing part 235, a position correction (referred to as "a local search") is performed by moving the pixel position of the watermarked image acquired such that the moved pixel position correspond to the pixel position of the standard image of the bill serving as the reference and that the watermarked image in the moved pixel position in which the absolute value of the correlation coefficient between both images shows the maximum value is extracted to identify the authenticity of the bill.

That is, with respect to the bill to be conveyed, it is considered that some watermarks may be formed in slightly different positions on the respective bills and the conveyed bill may be inclined to some extent depending on the traveling condition. Therefore, the watermarked image read by the bill reading means 8 from the bill being conveyed may be shifted to some extent, and even if the correlation coefficient is obtained in such a condition, the adequate identification may not be performed.

Therefore, as schematically shown in FIG. 9, the acquired image data in the watermark area is, for example, as indicated by arrows, displaced up and down, and left and right by a predetermined number of pixels (the figure illustrates a situation that a position P1 of a characteristic image 110 is moved to a position P2 of the image 110' when the whole image data is shifted upward by three pixels), and values of the correlation coefficients are calculated by the above-mentioned formula 1 for the images in the respective displaced positions. That is, in executing such a position correction, for example, if the local search is performed by shifting the image data up and down, and from left and right by four pixels (±4 pixels), eighty one (81) kinds of correlation coefficients in total are derived, as a result of the local search. Then, the derived respective correlation coefficients are stored one after another in the RAM 224, and after all of the correlation coefficients are calculated eventually, the position in which the maximum absolute value of the correlation coefficient is obtained is specified as the position of the authenticity identification object.

In this way, even if the legitimate bill on which the watermark is formed is conveyed as the position of the watermark is more or less deviated in the bill, the position correction is performed by moving the pixel position of the acquired image around the original ones such that it is less likely that even the legitimate bill is identified as a counterfeit bill whereby the identification accuracy may be improved. In addition, if the aforementioned local search is executed in the comparison process of ST03 described above, the information subjected to the position correction may be directly applied in the process of ST05 described above.

FIGS. 10A to 10C schematically show a case that the comparison area (i, j) is set with [i=5 to 9, j=2 to 4] by utilizing the image data of the watermark area of FIG. 8A, for example. The comparison area in the actual measurement data of FIG. 10A is compared with the corresponding area of the reference data of FIG. 10B. Correlation coefficients are calculated by the above-described formula 1 for comparison areas in respective displaced positions as the comparison area of FIG. 10A is displaced by one (1) pixel up and down, and left and right. Then, the derived respective correlation coefficients are summarized as shown in FIG. 10C. Since the comparison area centering on the pixel position (i=7, j=3) has the maximum absolute value among the calculated correlation coefficients, this area is specified as the identification object for the authenticity.

As described above, in this embodiment, information of the watermarked image (two-dimensional image information) for preventing counterfeiting in the bill is acquired, and the acquired information is compared with the watermarked image information serving as the reference (standard image), whereby the accuracy of the authenticity identification may be improved. Then, with the above-mentioned configuration, it is possible to perform the authenticity identification by only the light receiving part 81*a* installed on the one side of the bill to be conveyed, thereby enabling prevention of a cost increase.

In addition, as long as the bill identification apparatus is configured to be capable of processing many types of bills, the identification processing steps for the watermark portion as described above are carried out after an identification process for determining the money type of the bill (which country issued in which kind of series of bill with which face value) is completed. Therefore, since the position where the watermark is formed is set for each money type, the standard data may be stored so as to correspond to the set position.

Further, in the above-mentioned configuration, the data stored in advance in the reference data storage 233 is used as the standard data by the transmitted light from the watermark area. However, such data by the transmitted light may be acquired from the bill to be conveyed. That is, if the image data is acquired by the reflected light and the transmitted light from the watermark area of the bill being conveyed and the above-mentioned process is performed, the authenticity of the watermark area can be identified.

As mentioned above, the embodiment of the present invention is described. However, the present invention is not limited to the above-described embodiments, and various modifications of the present invention can be implemented.

As described above, the present invention has a feature in identifying the authenticity of the bill with respect to the image information of the watermark portion of the bill serving as the identification object, in view of the contrast inversion between the images by the transmitted light and the reflected light, and the other configurations are not limited to those in the above-mentioned embodiment. Therefore, it may be configured such that the above-mentioned first comparison process may not be performed. In addition, in the above-mentioned identification method for the authenticity, the technique as described above may be performed as one of the authenticity identification processes with various kinds of techniques and it may also be configured to include another authenticity identification process than this. Therefore, the technique as described above may be performed as one of the authenticity identification processes with various kinds of techniques and it may also be configured to include another authenticity identification process than this.

Also, the configuration of the bill reading means 8 (which may be another configuration than the line sensor), and the mechanisms for driving the various types of driving members may be appropriately modified.

Further, with respect to a watermark formed on a paper sheet such as a bill, in general, a reflected image and a transmitted image are in a relationship of contrast inversion if the portion in which the watermark is formed is observed. Then, the paper sheet identification apparatus of the above-mentioned embodiment is, by utilizing such a relationship, to identify the authenticity by light receiving means installed on only one side of the paper sheet or the like being conveyed.

In particular, since the density value for each pixel acquired by the reflected light from the watermarked image and the density value for each pixel in the same position acquired by the transmitted light are in an inverse relationship such that the correlation coefficient R is calculated from the density values for the respective pixels of both images to yield a value shifted on the negative side in the range of $-1 \leqq R \leqq 1$, to which any value of the correlation coefficient R can be confined (the value −1 of the correlation coefficient is possible as the ideal value, but the correlation coefficient is actually a value greater than −1 because of the effect of defacement, wrinkles, misalignment of the watermark of the bill, and so on). Therefore, it is possible to derive such a relationship between density values related inversely and obtained by the transmitted light and the reflected light if a threshold value not exceeding a predetermined value is set, whereby the authenticity of the watermark formed on the paper sheet can be identified by the light receiving means installed only on the one side of the paper sheet to be conveyed. In addition, the density value for each pixel by the transmitted light from the watermarked image of the paper sheet or the like serving as the reference may be actually acquired by the transmitted light from the paper sheet or the like being conveyed, or may be stored in advance as a reference value in an identification processing part.

Further, the light receiving means is capable of receiving the transmitted light from the watermarked image of the paper sheet being conveyed, and the identification processing part calculates a correlation coefficient from a density value for each pixel by the transmitted light from the watermarked image acquired by the light receiving means and a density value for each pixel by the transmitted light from the watermarked image of the paper sheet serving as a reference, whereby the authenticity of the watermarked image can be identified based on the correlation coefficient.

In such a configuration, since a correlation coefficient is calculated from a density value for each pixel by the transmitted light from the watermarked image of the paper sheet being conveyed and a density value for each pixel by the transmitted light from the watermarked image of the paper sheet serving as the reference, and the authenticity of the bill is identified, whereby a paper sheet on which no watermarked design is formed can be eliminated.

Further, when the identification processing part calculates a correlation coefficient, the identification processing part executes a position correction by moving the pixel position of the acquired watermarked image so as to correspond to the pixel position of the watermarked image of the paper sheet serving as the reference, so as to extract the pixel position in which the maximum absolute value of the correlation coefficient is obtained, and can identify the authenticity of the bill.

In such a configuration, even if the legitimate paper sheet on which the watermark is formed is conveyed as the position of the watermark is more or less deviated in the paper sheet, the position correction is performed by moving the pixel position of the acquired image around the original ones such that it is less likely that even the legitimate paper sheet is identified as a counterfeit paper sheet whereby the identification accuracy may be improved. In addition, if such a position correction is executed in a wide range, a disadvantage such as decrease in a processing speed may be caused. Therefore, for example, a shift search may be performed by moving the area up and down, and left and right by several pixels (± several pixels) as a certain point is centered. Therefore, such a position correction is referred to as "a local search".

Further, the light irradiated to the paper sheet may be near-infrared light.

As described above, with respect to a watermark formed on a paper sheet such as a bill, a reflected image and a transmitted image are in a relationship of contrast inversion if the portion in which the watermark is formed is observed. This phenomenon can also be observed with visible light, and it can be more clearly observed with the near-infrared light. Therefore, by actually utilizing the near-infrared light instead for the transmitted light and the reflected light, the identification accuracy of the authenticity may be improved.

Further, the paper sheet identification method of the above-mentioned embodiment, comprises: a image acquisition step of acquiring reflected light from a watermarked image formed on a paper sheet being conveyed for each pixel as a unit of a predetermined size including color information having brightness; and an authenticity identification step of identifying an authenticity of the watermarked image by the reflected light based on a correlation coefficient, the correction coefficient being calculated from a density value for each pixel of the watermarked image by the reflected light and a density value for each pixel of the watermarked image by transmitted light of a paper sheet as a reference.

As described above, with respect to a watermark formed on a paper sheet such as a bill, a reflected image and a transmitted image are in a relationship of contrast inversion if the portion in which the watermark is formed is observed. Then, the paper sheet identification method of the above-mentioned embodiment is, by utilizing such a relationship, to identify the authenticity by the light receiving means installed on only one side of the paper sheet being conveyed.

In concrete, in the authenticity identification step by the reflected light as described above, a correlation coefficient R is calculated from density values for respective pixels of both images by utilizing that the density value for each pixel by the reflected light from the watermarked image and the density value for each pixel by the transmitted light acquired at the same position are in an inverse relationship; and by setting a threshold value equal to or less than a predetermined value, a relationship between density values inversely related with each other acquired by the transmitted light and the reflected light is derived, whereby the authenticity of the watermark formed on the paper sheet is identified. That is, since the density value for each pixel by the reflected light from the watermarked image and the density value for each pixel by the transmitted light acquired at the same position are in an inverse relationship within the range of $-1 \leqq R \leqq 1$, to which any value of the correlation coefficient R is confined, and the correlation coefficient can be obtained to be a value shifted on the negative side (the value −1 of the correlation coefficient is possible as the ideal value, but the correlation coefficient is actually a value greater than −1 because of the effect of defacement, wrinkles, misalignment of the watermark of the bill, and so on), a relationship between respective density values related inversely acquired by the transmitted light and the reflected light can be derived by setting a threshold value that is equal to or less than a predetermined value, and the authenticity of the watermark formed on the paper sheet can be identified by the light receiving means installed on only one side with respect to the paper sheet being conveyed. In addition, the density value for each pixel by the transmitted light from the watermarked image of the paper sheet serving as the reference may be actually acquired from the transmitted light from the paper sheet being conveyed, or may be stored in advance as the reference value.

Further, according to the above-described embodiment, a light receiving part which receives reflected light from a watermarked image formed on a paper sheet to be conveyed, a converter which converts the reflected light from the watermarked image received by the light receiving part into reflected light data having a brightness level for each pixel, a memory (for example a ROM, a RAM, an EEPROM, an HDD, or the like) which stores the converted reflected light data converted by the converter in association with the pixel position thereof, and a processor (for example, a CPU or the like) which carries out an operation may be included. This processor functions to be capable of calculating a correlation coefficient so as to correspond to the pixel position from the converted reflected light data for each pixel converted by the converter and the reference data for each pixel by the transmitted light from the watermarked image of the paper sheet serving as the reference. Further, since the processor also functions to be capable of judging whether or not the absolute value of the correlation coefficient is equal to or greater than the predetermined threshold value, it is possible to identify the authenticity of the watermarked image based on the judgment.

Here, the above-described light receiving part may be capable of receiving transmitted light from the watermarked image of the paper sheet being conveyed. Then, the converter may convert the transmitted light from the watermarked image received by the light receiving part into transmitted light data having a brightness level for each pixel. The memory is capable of storing the converted transmitted light data converted by the converter in association with a pixel position thereof. Utilizing such data, the above-mentioned processor functions to be capable of calculating a correlation coefficient so as to correspond to the pixel position from the converted transmitted light data for each pixel converted by the converter and the reference data for each pixel by the transmitted light from the watermarked image of the paper sheet serving as the reference. Then, since the processor also functions to be capable of judging whether or not the absolute value of the correlation coefficient is equal to or greater than the predetermined threshold value, it is possible to identify the authenticity of the watermarked image based on the judgment. Moreover, this processor functions to be capable of calculating a shift correlation coefficient corresponding to the shifted pixel position from the converted reflected light data and the reference data by shifting the pixel position of the converted reflected light data. Then, a pixel position having a greater value between the absolute value of the correlation coefficient before shifting and the absolute value of the shift correlation coefficient is set as a comparison pixel position, and is stored in the memory in association with the image data for each pixel for identifying the authenticity of the image. In addition, this shifting may be performed by shifting it back and forth, and from side to side by a predetermined number of pixels (for example, one pixel) on the basis of the position of the original image determined from the contrasting density data of the printing area of the bill. Then, a correlation coefficient is determined every shifting, and a shifted position having the maximum absolute value among those correlation coefficients may be set as a comparing pixel position for comparison, to be stored in association with the converted reflected light data or the converted transmitted light data (this is mainly digital data).

Further, the image acquisition step comprises: acquiring transmitted light from the watermarked image formed on the paper sheet to be conveyed for each pixel as one unit of a predetermined size, which includes color information having brightness, and an authenticity identification step is also included, the authenticity identification step comprising: calculating a correlation coefficient from a density value for each pixel by the transmitted light from the watermarked image acquired in the image acquisition step and a density value for each pixel by the transmitted light from the watermarked image of the paper sheet serving as the reference; and identifying the authenticity of the watermarked image by the transmitted light based on the correlation coefficient.

In such a configuration, a correlation coefficient is calculated from a density value for each pixel by the transmitted light from the watermarked image acquired in the image acquisition step, and a density value for each pixel by the transmitted light from the watermarked image of the paper sheet serving as the reference; and the authenticity of the watermarked image is identified based on the correlations coefficient, whereby a paper sheet on which no watermarked design is formed can be eliminated.

Further, in the authenticity identification step by the reflected light and the authenticity identification step by the transmitted light, when a correlation coefficient is calculated, a position correction is conducted by moving the pixel position of the acquired watermarked image so as to correspond to the pixel position of the watermarked image of the paper sheet serving as the reference, and the authenticity of the bill can be identified as the pixel position in which the maximum absolute value of the correlation coefficient is obtained are extracted.

In such a configuration, even if the legitimate paper sheet has the watermark formed in a more or less deviated position, the position correction is performed by moving the pixel position of the acquired image around the original ones such that it is less likely that even the legitimate paper sheet is identified as a counterfeit paper sheet, whereby the identification accuracy may be improved.

As described above, the paper sheet identification apparatus and the paper sheet identification method, which can identify the authenticity of the watermark area formed on the paper sheet, can be obtained without increasing the costs.

The present invention can be incorporated into various types of apparatuses to identify the authenticity of the paper sheet other than the bill such as a gift certificate and coupon ticket, in addition to the above-mentioned bill.

What is claimed is:

1. A paper sheet identification apparatus comprising:

a light receiving unit which receives reflected light from a watermarked image formed on a paper sheet being conveyed;

a converter which converts the reflected light from the watermarked image received by the light receiving unit into data for each of a plurality of pixels including color information having brightness; and an identification processing part which identifies an authenticity of the watermarked image based on a correlation coefficient, which correlation coefficient is calculated from 1) a reflected-light density value for each pixel converted by the converter and 2) a transmitted-light reference density value for each pixel associated with light transmitted through the watermarked image.

2. The paper sheet identification apparatus according to claim 1, further comprising a light emitting unit disposed across a paper-sheet conveyance passageway from the light receiving unit, wherein:

the light receiving unit receives light emitted by the light emitting unit and transmitted through the watermarked image of the paper sheet being conveyed;

the transmitted-light reference density value for each pixel is determined using the light transmitted through the watermarked image; and the identification processing part calculates the correlation coefficient from the transmitted-light reference density value determined for each pixel using the light transmitted through the watermarked image and acquired by the light receiving unit.

3. The paper sheet identification apparatus according to claim 1, wherein, when the correlation coefficient is calculated, the identification processing part executes a position correction by moving a pixel position of the acquired watermarked image so as to match a corresponding pixel position of the watermarked image of the paper sheet serving as the reference and extract such a pixel position that the correlation coefficient has a maximum value whereby the authenticity is identified.

4. The paper sheet identification apparatus according to claim 1, wherein light irradiated to the paper sheet is near-infrared light.

5. A paper sheet identification method comprising:

an image acquisition step of acquiring reflected light from a watermarked image formed on a paper sheet being conveyed for each of a plurality of pixels, the reflected light including color information having brightness; and an authenticity identification step of identifying an authenticity of the watermarked image based on a correlation coefficient, which correlation coefficient is calculated from 1) a reflected-light density value determined for each pixel using light reflected from the watermarked image and 2) a transmitted-light reference density value for each pixel associated with light transmitted through the watermarked image.

6. The paper sheet identification method according to claim 5, wherein:

the image acquisition step comprises a step of acquiring the light transmitted through the watermarked image formed on the paper sheet being conveyed for each pixel, the transmitted light including color information having brightness, the transmitted-light reference density value for each pixel is determined using the light transmitted through the watermarked image, and the authenticity identification step comprises the steps of: calculating the correlation coefficient from the transmitted-light reference density value determined for each pixel using the light transmitted through the watermarked image and acquired in the image acquisition step.

7. The paper sheet identification method according to claim 5, wherein a position correction is executed by moving a pixel position of the watermarked image so as to match a corresponding pixel position of the watermarked image on the paper sheet serving as the reference, and the pixel position in which the correlation coefficient has a maximum absolute value is extracted so that the authenticity is identified.

8. A paper sheet identification apparatus comprising:

a light receiving part which receives reflected light from a watermarked image formed on a paper sheet being conveyed;

a converter which converts the reflected light from the watermarked image received by the light receiving part into reflected light data of a brightness level;

a memory which stores converted reflected light data converted by the converter in association with a pixel position thereof; and a processor which carries out an operation, wherein the processor:

calculates a first correlation coefficient from 1) the converted reflected light data for each pixel converted by the converter and 2) transmitted-light reference data for each pixel associated with light being transmitted through the watermarked image on the paper sheet by matching corresponding pixel positions thereof; and judges whether an absolute value of the correlation coefficient is equal to or greater than a predetermined threshold value such that the authenticity of the watermarked image is identified based on judgment thereof.

9. The paper sheet identification apparatus according to claim 8, further comprising a light emitting unit disposed across a paper-sheet conveyance passageway from the light receiving unit, wherein:

the light receiving part receives light emitted by the light emitting unit and transmitted through the watermarked image on the paper sheet being conveyed;

the converter converts the light transmitted through the watermarked image and received by the light receiving part into transmitted light data for each pixel; and the processor:

calculates a second correlation coefficient from 1) the converted transmitted light data for each pixel converted by the converter and 2) the transmitted-light reference data for each pixel; and judges whether an absolute value of the second correlation coefficient is equal to or greater than a predetermined threshold value such that the authenticity of the watermarked image is identified based on judgment thereof.

10. The paper sheet identification apparatus according to claim 8, wherein the processor:

calculates a shift correlation coefficient corresponding to a shift pixel position from the converted reflected light data and the reference data as the pixel position of the converted transmitted light data; and determines a pixel position in which a greater absolute value of the correlation coefficient is obtained between the correlation coefficient before shift and the shift correlation coefficient as a comparison pixel position.

11. The paper sheet identification apparatus according to claim 2, wherein, when the correlation coefficient is calculated, the identification processing part executes a position correction by moving a pixel position of the acquired watermarked image so as to match a corresponding pixel position of the watermarked image of the paper sheet serving as the reference and extract such a pixel position that the correlation coefficient has a maximum value whereby the authenticity is identified.

12. The paper sheet identification apparatus according to claim 2, wherein light irradiated to the paper sheet is near-infrared light.

13. The paper sheet identification apparatus according to claim 3, wherein light irradiated to the paper sheet is near-infrared light.

14. The paper sheet identification method according to claim 6, wherein a position correction is executed by moving a pixel position of the watermarked image so as to match a corresponding pixel position of the watermarked image on the paper sheet serving as the reference, and the pixel position in which the correlation coefficient has a maximum absolute value is extracted so that the authenticity is identified.

15. The paper sheet identification apparatus according to claim 9, wherein the processor:

calculates a shift correlation coefficient corresponding to a shift pixel position from the converted reflected light data and the reference data as the pixel position of the converted transmitted light data; and determines a pixel position in which a greater absolute value of the correlation coefficient is obtained between the correlation coefficient before shift and the shift correlation coefficient as a comparison pixel position.

16. The paper sheet identification apparatus according to claim 1, further comprising a reference data storage part containing therein pre-stored, standard transmitted-light reference density data for each pixel associated with light transmitted through the watermarked image.

17. The paper sheet identification method according to claim 5, wherein the transmitted-light reference density value for each pixel associated with light transmitted through the watermarked image is pre-stored, standard transmitted-light reference density data.

18. The paper sheet identification apparatus according to claim 8, further comprising a reference data storage part containing therein pre-stored, standard transmitted-light reference density data for each pixel associated with light transmitted through the watermarked image.

19. A paper sheet identification apparatus comprising:

a light receiving unit which receives one of A) reflected light reflected by a watermarked image formed on a paper sheet being conveyed through the paper identification apparatus and B) transmitted light that has been transmitted through the watermarked image;

a converter which converts the received light received by the light receiving unit into data for each of a plurality of pixels including color information having a brightness value; and an identification processing part which identifies an authenticity of the watermarked image based on a correlation coefficient, which correlation coefficient is calculated from 1) density values for the plurality of pixels determined using the received light and 2) reference density values for the plurality of pixels associated with the other of A) reflected light reflected by the watermarked image and B) transmitted light that has been transmitted through the watermarked image.

20. The paper sheet identification apparatus according to claim 19, wherein the light receiving unit receives light reflected by the watermarked image and the reference density values for the plurality of pixels are associated with light that has been transmitted through the watermarked image.

21. The paper sheet identification apparatus according to claim 19, further comprising a light emitting unit that emits said other of A) reflected light reflected by the watermarked image and B) transmitted light that has been transmitted through the watermarked image.

22. The paper sheet identification apparatus according to claim 20, further comprising a reference data storage part containing therein pre-stored, standard reference density values for the plurality of pixels associated with said other of A) reflected light reflected by the watermarked image and B) transmitted light that has been transmitted through the watermarked image.

* * * * *